Oct. 6, 1942.  G. H. ENNIS  2,297,754
METHOD OF LOCATING STRATA IN WELLS AND ELECTRODE APPARATUS THEREFOR
Filed Dec. 28, 1936  5 Sheets-Sheet 4
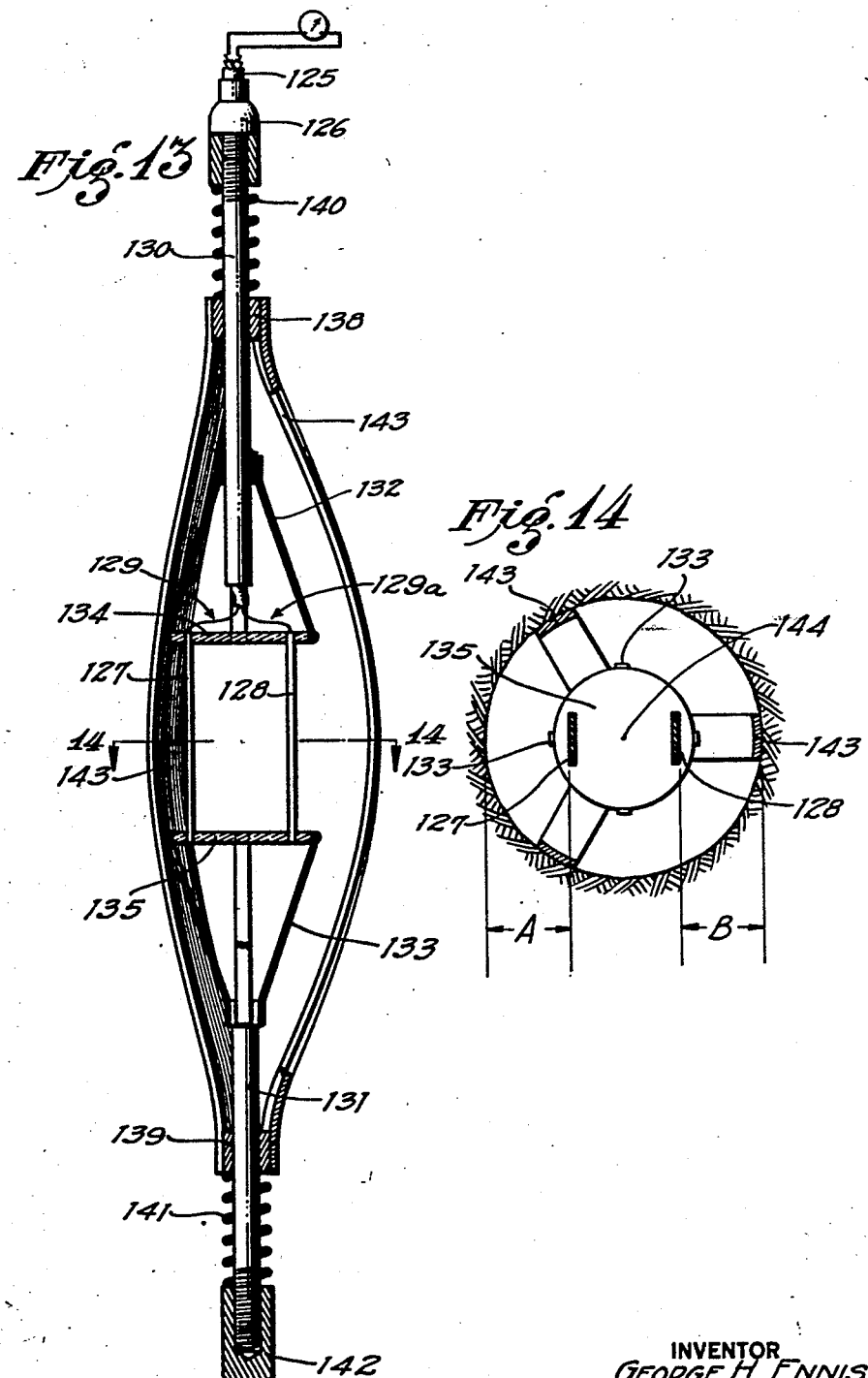
INVENTOR
GEORGE H. ENNIS
BY
ATTORNEY

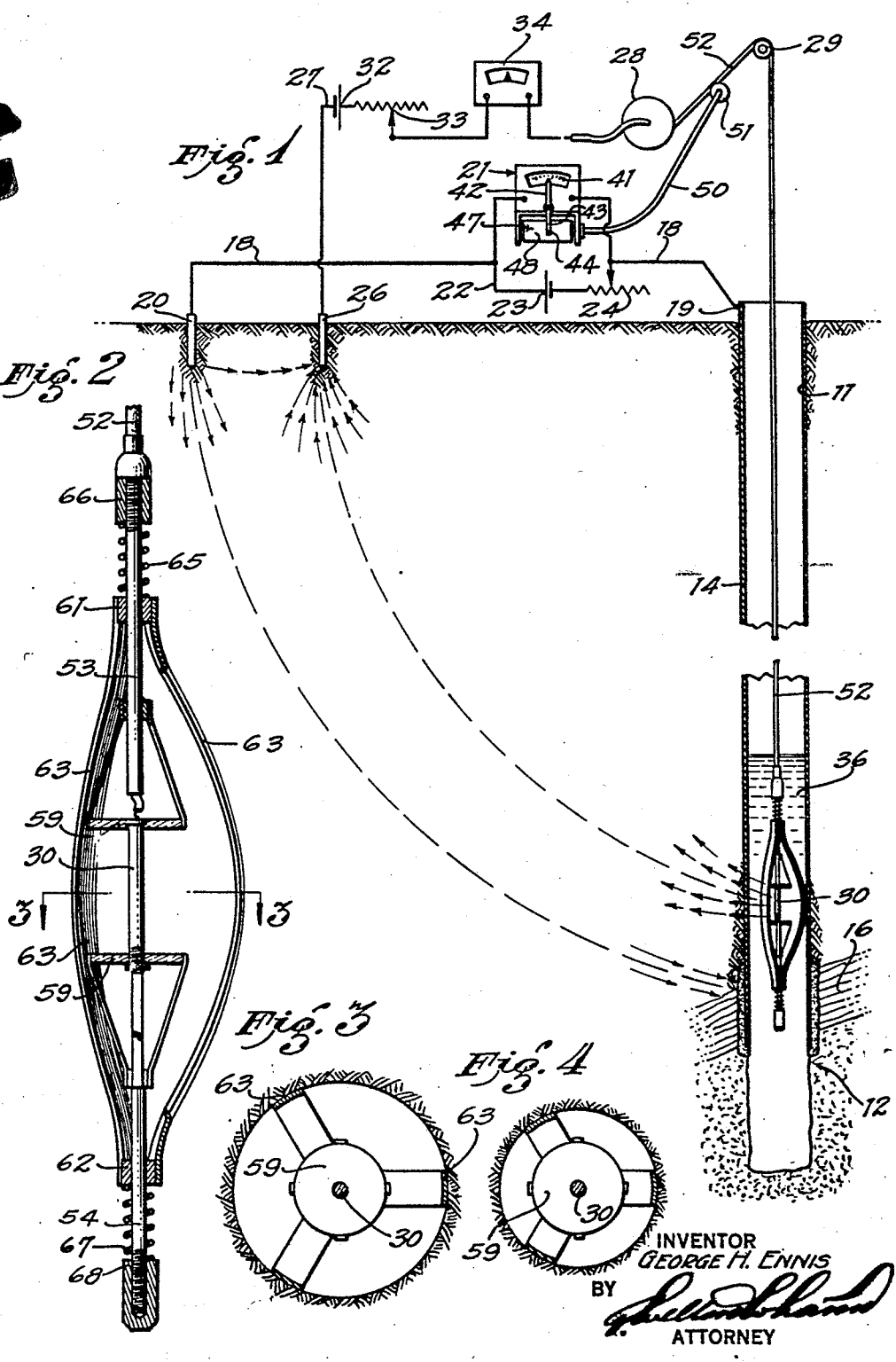
Oct. 6, 1942.  G. H. ENNIS  2,297,754
METHOD OF LOCATING STRATA IN WELLS AND ELECTRODE APPARATUS THEREFOR
Filed Dec. 28, 1936    5 Sheets—Sheet 1
INVENTOR
GEORGE H. ENNIS
BY
ATTORNEY Oct. 6, 1942.     G. H. ENNIS     2,297,754
METHOD OF LOCATING STRATA IN WELLS AND ELECTRODE APPARATUS THEREFOR
Filed Dec. 28, 1936     5 Sheets-Sheet 2
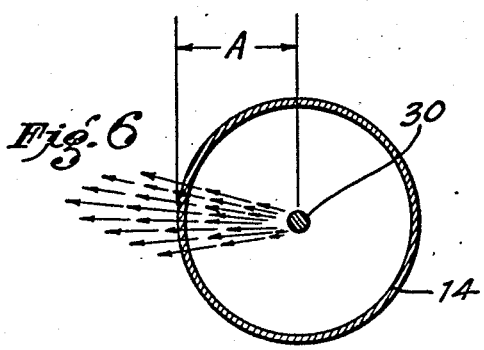
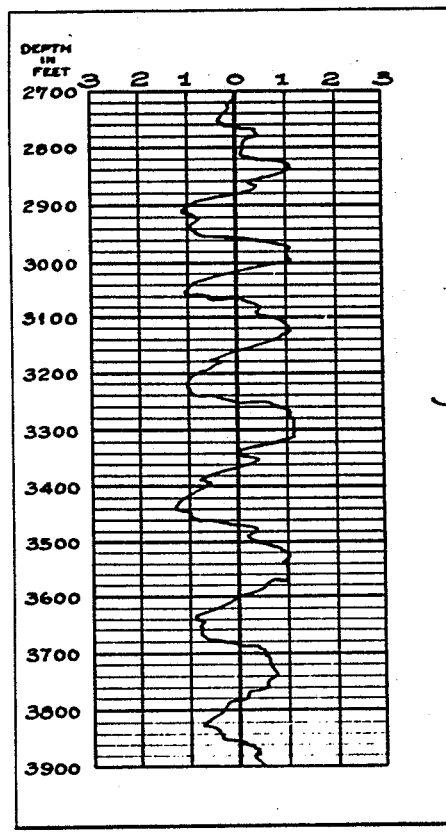
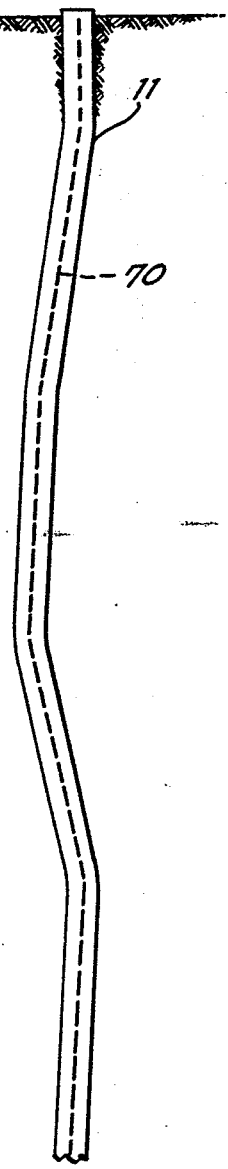
INVENTOR
GEORGE H. ENNIS
BY
ATTORNEY

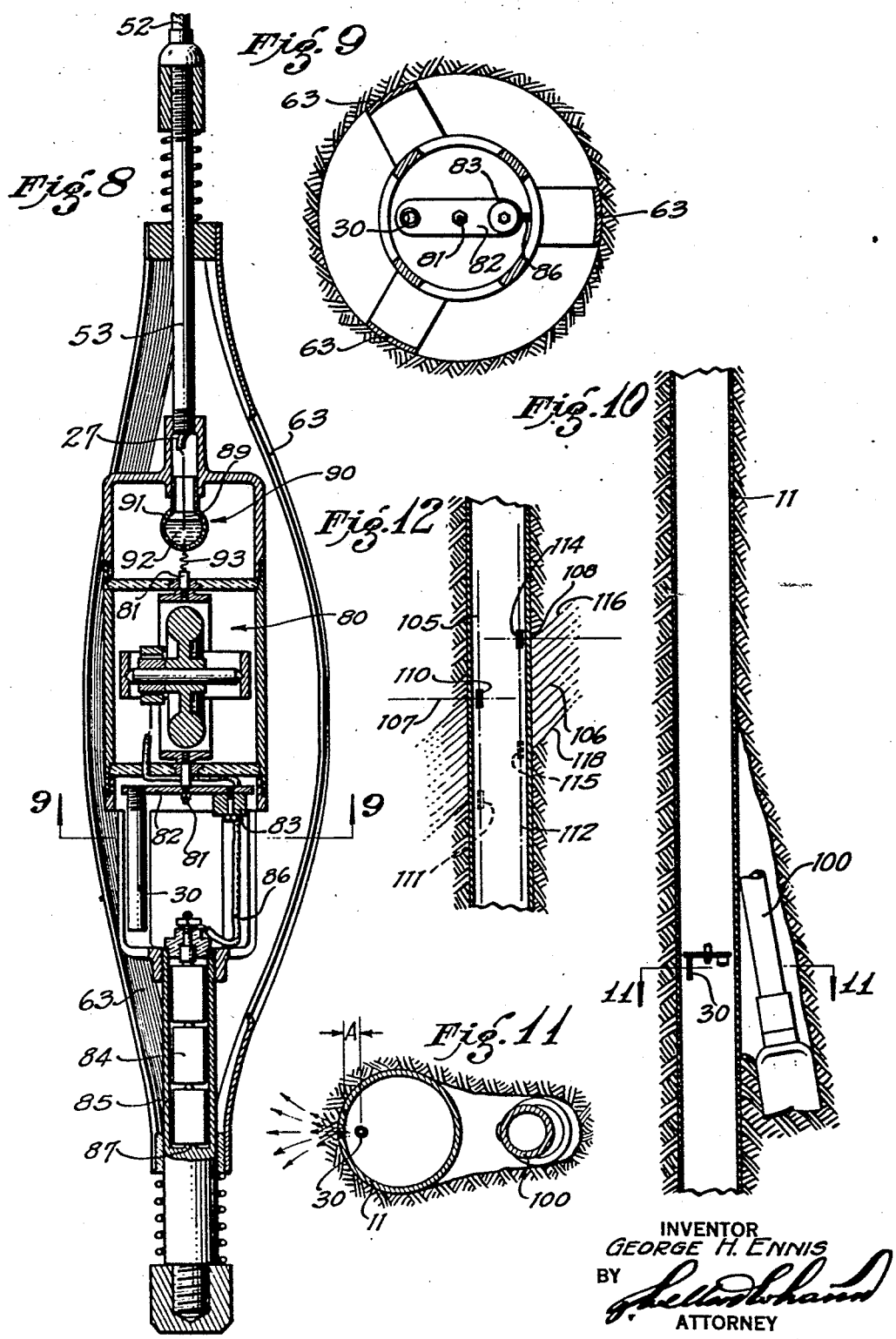

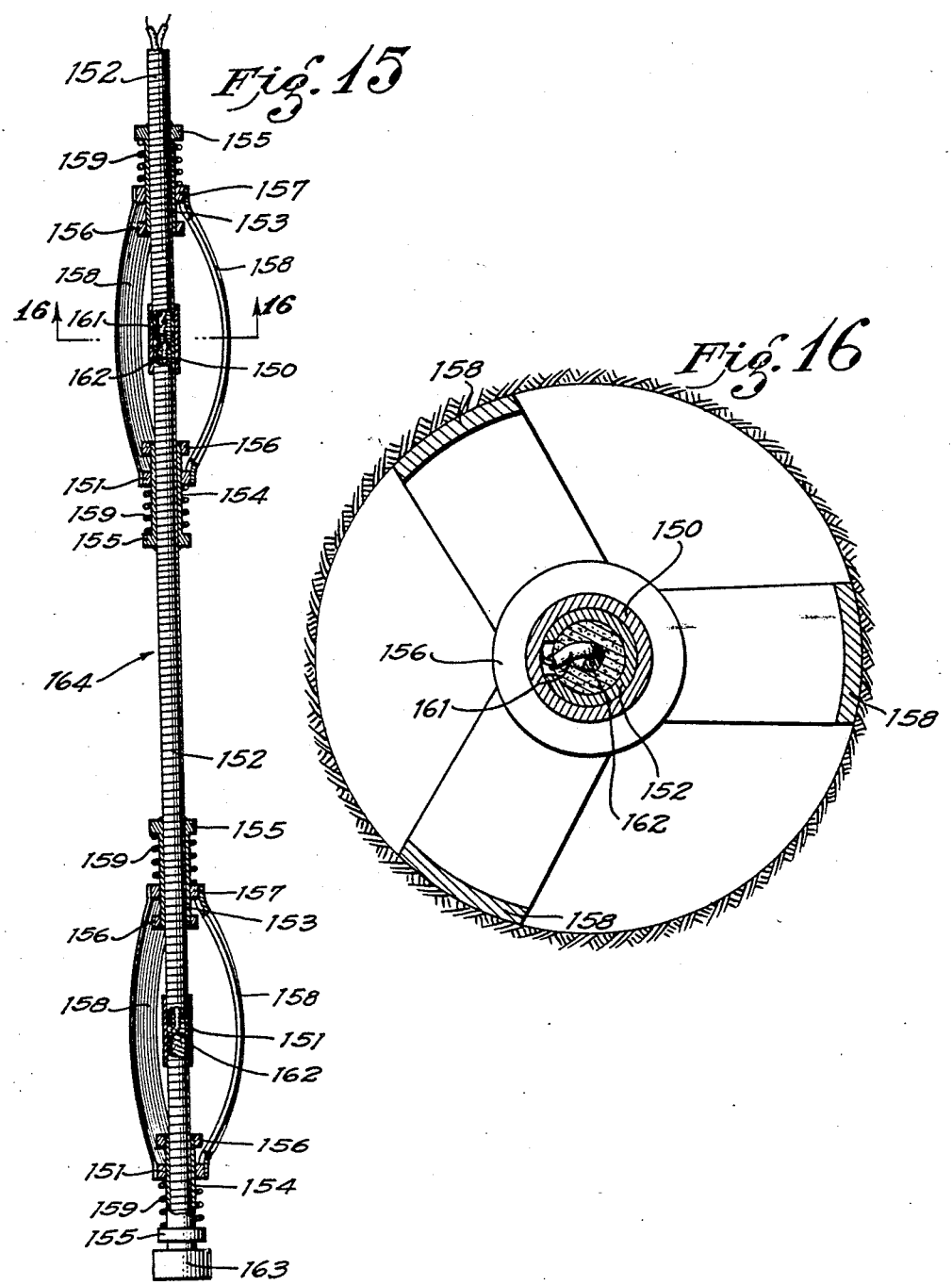

Patented Oct. 6, 1942

2,297,754

UNITED STATES PATENT OFFICE 2,297,754

METHOD OF LOCATING STRATA IN WELLS AND ELECTRODE APPARATUS THEREFOR

George H. Ennis, Long Beach, Calif., assignor of one-half to Robert V. Funk, Long Beach, Calif.

Application December 28, 1936, Serial No. 117,810

15 Claims. (Cl. 175—182)

My invention relates to method and apparatus for testing wells, and is directed more particularly to certain improvements on prior art methods and to electrode apparatus for use in the practice of my method and also susceptible of use in other methods.

In the oil producing industry in which my invention is of particular utility it is of material assistance in the production of oil to know the exact location of various strata penetrated in the drilling of an oil well, and different inventors have devised methods for procuring this information. In my copending application for Method and apparatus for electrically coring in cased bore holes, Serial No. 28,891, filed June 28, 1935, of which this application is a continuation-in-part, I have disclosed a unique method of locating strata penetrated in drilling an oil well and a method which is capable of making accurate determinations through well casing which has been installed in the well.

In electrical or electro-chemical methods for locating the various strata in a well, the values measured or recorded in making the tests are sometimes very small and the deviations in values which are relied on to indicate the location of the different stratum are often minute in character. In view of these facts it is highly important that the fixed values in the method do not fluctuate, otherwise false indications and erroneous determinations will occur.

An object of my present invention is to provide a method of testing wells in which an electrode is connected to a testing circuit and lowered into the well, and values in the testing circuit measured, and in which the electrical or electro-chemical values between the electrode in the well and the wall of the well are maintained uniform.

Most oil wells are not drilled straight due to inability of the well drilling apparatus to drill a straight hole and the axis or contour thereof is crooked. These deviations from vertical are very often in different directions, and therefore the axis or contour of the well will zig-zag back and forth.

It is an object of my invention to provide a method of testing wells, as pointed out heretofore, in which the electrode which is moved in the well is maintained in uniform relationship to the wall of the well to which, or through which, the test is being made, and in which the electrode is maintained in a uniform relationship to the axis or contour of the well when it is moved into various positions along the well.

Another object of my invention is to provide a method in which the movable electrode is maintained substantially concentric to and in alignment with the axis of the well at all positions into which it is moved along the well.

In one of the methods of my invention the wall of the well, the liquid in the well, and the movable electrode constitute a voltaic cell for producing an electromotive force or current flow at the place occupied by the movable electrode. For obtaining accurate determinations, it is necessary that the values of this voltaic cell be maintained constant.

It is an object of my invention to provide a method as pointed out in which the voltaic cell formed in the well, and including the movable electrode which constitutes a plate of the voltaic cell, has its values maintained substantially constant or uniform at all positions of the movable electrode along the well.

It sometimes occurs in the drilling of an oil well that a part or object, such as a bit or piece of drill pipe, becomes lodged in the well, cannot be removed, and must be drilled around. Such a part or object often interferes with the performance of well tests and causes false determinations.

It is an object of my invention to provide a method of testing a well as pointed out heretofore in which interfering objects located adjacent the well may be avoided.

It is an object of my invention to provide a method of testing a well in which the movable electrode is supported in the well along the side or wall thereof remote from the interfering object so that the interfering object will have but a minimum of influence on the test.

It is quite valuable not only to locate the strata but also to determine its inclination, which data is quite valuable from a geological standpoint.

One of the objects of my invention is to provide a method whereby the inclination of strata in the well may be determined.

It is an object of my invention to provide a method of determining the inclination of strata in a well in which a test of the formation is made along one side or wall of the well and is thereafter made along the opposite side or wall of the well. By comparing the determinations which have been made the depth at which a given formation contacts one side of the well and the opposite side of the well may be determined. By knowing the diameter of the well and the inclination of the well itself the slant or inclination of the strata may thus be determined.

The method of my invention, the objects of which have been set out in part heretofore, is of utility in its entirety to make the determinations referred to, but in addition certain steps thereof are of utility when used alone or in combination with other steps in other methods, and my patent protection is, therefore, to cover not only the invention in its entirety but in its several component steps which are susceptible of independent use.

I have discovered that it is necessary where small values are measured, that is, microvolts, microamperes, etc., to maintain a uniform relationship between the wall of the well and the electrode or electrodes employed; and I have invented an electrode construction which has been highly successful in the method referred to heretofore but also in other methods in use in wells for obtaining information as to water leakages or strata location; and it, in one of its modifications, may be used in other methods involving the lowering of an electrode means in a well.

It is also an object of my invention to provide electrode apparatus especially designed for use in the performance of the aforesaid methods in which uniform relationships are maintained between the wall of the well and the electrode means of the electrode apparatus.

It is an object of my invention to provide an electrode construction which includes a means for holding the electrode means in a predetermined axial position with relation to the axis of the well and for maintaining this relationship as the apparatus is moved along said well from one position to another.

It is an object of my invention to provide a means for causing the electrode means to accurately follow the axis or contour of the well.

It is also an object of my invention to provide an electrode apparatus in which the electrode means is maintained in a definite oriented position.

I have furthermore discovered that a swing movement of the electrode means produces false determinations. If the electrode means is free to move back and forth across the diameter of the well the resistance will be decreased and voltage increased.

It is an object of my invention to provide an electrode apparatus in which the electrode means is restrained from lateral or swinging movement.

A still further object of my invention is to provide an electrode apparatus which includes an electrode positioning means for positioning the electrode means with relation to the wall of the well, and means for raising and lowering the electrode means in the well, and an electrical conductor for connecting the electrode to suitable testing apparatus.

My invention is adapted for and capable of use either in the testing of cased holes, that is, ones in which the well casing has been installed, in partly cased holes, or in open holes in which no casing has yet been installed.

It is furthermore an object of my invention to provide a method and apparatus for locating strata in a well in which no mathematical computations or calculations are necessary to obtain or use the information which is given by the performance of my invention.

I will now describe, for the purpose of instructing those skilled in the art, certain methods of my invention and certain apparatus which have proven to be very valuable when practiced in the art. I will also describe various electrode apparatus incorporating my invention. It should be understood, however, that I intend my invention to be broadly construed in accordance with the appended claims and not limited to any details which are susceptible of modification or alteration.

In the course of the following description additional objects and advantages of my invention will be brought out.

Referring to the accompanying drawings:

Fig. 1 is a diagrammatic view illustrating apparatus of my invention and capable of practicing the method of my invention.

Fig. 2 is a longitudinal sectional sectional view through an electrode apparatus incorporating certain features of my invention.

Fig. 3 is a sectional view taken on the line 3—3 of Fig. 2.

Fig. 4 is a sectional view taken on the line 3—3 of Fig. 2, but differs from Fig. 3 in that the apparatus is contained in a well of smaller diameter.

Fig. 5 is a diagrammatic view illustrating the contour of a crooked well and the manner in which the electrode apparatus is guided through the well.

Fig. 6 is a horizontal sectional view showing the electrode in place in the well and illustrating certain current flows employed by my invention.

Fig. 7 is a view showing a record or chart made by the apparatus shown in Fig. 1 and made during the performance of my invention.

Fig. 8 is a longitudinal sectional view through an alternative form of electrode apparatus of my invention which incorporates therein a means for orienting the electrode.

Fig. 9 is a sectional view taken on the line 9—9 of Fig. 8.

Fig. 10 is a diagrammatic view of an oil well or a part thereof showing the manner in which my invention is practiced when there is an interfering object adjacent the well.

Fig. 11 is a section taken on the line 11—11 of Fig. 10.

Fig. 12 is a diagrammatic view of a part of a well illustrating the manner in which the inclination of a stratum of formation in the well may be determined by the use of my invention.

Fig. 13 is a vertical sectional view through an electrode apparatus which supports two electrodes.

Fig. 14 is a section taken on the line 14—14 of Fig. 13.

Fig. 15 is a vertical sectional view through an electrode apparatus having a plurality of electrodes held concentric to the well.

Fig. 16 is a section taken on the line 16—16 of Fig. 15.

Referring now to the drawings in detail, I will describe the apparatus disclosed in Figs. 1 to 4 inclusive. In Fig. 1 the numeral 11 represents a well which has been drilled to an oil bearing formation 12 and in which a well casing 14 has been installed and cemented to a layer of rock or shale 16 in order to seal from the well all of the oil or water bearing formations above the shale 16.

The apparatus of my invention disclosed in Fig. 1 includes a conductor 18 which is connected to the well casing 14, as indicated at 19, and which is connected to a ground 20 at a distance remote from the well. This conductor 18 and associated parts constitute an external well circuit of my invention, and through which an external flow of current may be established. Included in the conductor 18 is a recording device 21, and also there is a balancing or shunt circuit 22 having a battery or other source of energy 23 and an adjustable resistance 24. The recording means 21 may be a simple form of meter adapted to record electrical characteristics, such as milliamperes or millivolts, or may be one which forms a graph or chart like that illustrated in Fig. 7. The latter type is preferred and is illustrated herein, and includes a face 41 and a pointer 42 which may be connected with internal mechanism of the recording means. Extending from the pointer and movable therewith is an arm 43 which carries a stylus 44 adapted to record a curve on a sheet of graph paper carried by a drum 47. The drum 47 is rotated by a flexible shaft 50, which flexible shaft 50 is driven by a sheave 51, which sheave is in turn rotated by a cable 52 which extends into the well, and by this means the drum is moved in accordance with the position of certain apparatus employed in making the test so that the curve produced will be calibrated as to depth. Additional details of this will be given in describing the other parts of the apparatus.

Placed in the earth a distance remote from the well is a ground 26 to which a conductor 27 is connected. This conductor 27 and its associated parts constitute an external well circuit of my invention. The conductor 27 is connected to the end of the cable 52 which is wound on a drum 28 and extends through the cable 52 and is connected to an electrode 30 which forms a part of the electrode apparatus of my invention. The cable 52, as shown, extends over a sheave 29 positioned above the upper end of the well 11. The conductor 27 includes a recording means or meter 34 which measures electrical characteristics in the conductor 27 and may be either a milliammeter or millivoltmeter. The conductor 27 also includes a source of energy in the form of a battery 32 and a variable resistance 33.

In the form of my invention illustrated in Fig. 1, the well 11 is shown as containing an electrolyte 36, such as salt water ordinarily found in a well, or a special electrolyte which may be placed in the well as needed. The electrode 30 is preferably of the type to form the plate of a voltaic cell so that the well casing 14 which may constitute the wall of the well, the electrolyte 36, and the electrode 30 constitute a voltaic cell.

The electrode apparatus which I utilize in the form of my invention disclosed in Fig. 1 is shown in detail in Figs. 2 to 4 inclusive. The lower end of the cable 52 is connected to the electrode apparatus, and the conductor 27 covered by a suitable insulation is electrically connected to the electrode 30. The apparatus includes an upper shaft 53, a lower shaft 54, and interconnecting supporting means in the form of an upper plate 55, a lower plate 56, and three interconnecting supporting arms 57. Secured to the supporting arms 57 are plates 59 which support the electrode 30. Slidably mounted on the shafts 53 and 54 are hubs 61 and 62 to which centralizing arms 63 are connected. These centralizing arms 63 are flexible and may bow outwardly or be forced inwardly so that they will engage the wall of the well and thus maintain the electrode 30 in an exactly concentric position in the well. For the purpose of assuring an expansion of the arms 63 an upper spring 65 is compressed between the hub 61 and a shoulder 66, and a lower spring 67 is compressed between the hub 62 and a shoulder 68. With this mechanism the electrode 30 will always be maintained in a uniform position with respect to the wall of the well and with respect to the axis or contour of the well. As illustrated in Fig. 5, the well 11 may be of the contour as shown, and the electrode will be maintained in a uniform position as indicated by the short lines 70 along the axis or contour of the well. As will be pointed out hereinafter, the maintaining of this definite relationship is highly important to the obtaining of accurate determinations. As shown in Fig. 4, if the well is of smaller diameter than that shown in Fig. 3, the arms 63 will be collapsed, this resulting in the hubs 61 and 62 moving upwardly and downwardly in opposite directions, but it will be seen that the electrode 30 is maintained in its central predetermined position.

The form of apparatus disclosed in Fig. 1 constitutes one which I have found to be very satisfactory in locating formations in a well. In the apparatus of Fig. 1 the electrode 26 is preferably located at a distance of about 125 feet from the well 11 and the electrode 20 is located at a distance of about 125 feet from the electrode 26 and 250 feet from the well 11. It is conducive to more distinct recording to locate these two grounds 20 and 26 at such points that there will be a minimum of electrical interference to the flows of currents and the voltages in the circuits, and this should be done even though it is necessary, for example, to place the two grounds 20 and 26 closer together or to place them closer or farther from the well 11. For example, it is desirable to keep these two grounds away from any surface piping which form conductors and which in an oil field would ultimately lead to the well being tested.

It is, of course, well recognized that there are certain currents set up in the earth when surface circuits are made. In using my invention I find it more satisfactory to arrange the apparatus so that the flow of current through the external circuit is in harmony with rather than in opposition to the currents generated in the earth, and which may be generally designated as internal circuits or current flows as distinguished from external circuits or external current flows. In fact, in this apparatus I am able to use the internal flows of current in its operation.

Since the well casing 14 has already been installed in the well and is made from iron, it is desirable to form all of the other electrodes and grounds such as 20, 26, and 30 of opposite electro-potentials so that, as pointed out heretofore, the flows of current will be in the direction which would naturally flow in the ground.

The well casing 14, the electrode 30, and the electrolyte 36 constitute a voltaic cell and produce an electrical potential and electrical current which flow through the external well circuit and also through the ground which comprises the internal well circuit. It is, therefore, desirable to form the electrode 30 from a metal which is electro-positive with respect to the iron casing 14 such, for example, as zinc. It is, furthermore, desirable to form the ground or electrode 26 from a metal which is electro-negative with respect to the iron casing 14, and therefore this ground 26 may be made from any of a number of metals such as nickel, lead, tin, copper, silver, antimony, or gold.

With the electrodes so formed when the well circuit, including the external well circuit and the internal well circuit, is completed there will be a flow of current from the electrode 30 through the electrolyte 36 to the casing 14, from the casing 14 to the ground 26, and from the ground 26 through the conductor 27 through the various apparatus, and from thence into the well to the electrode 30. It should be strictly understood, however, that this direction of flow is not essential but merely desirable. It would be possible to reverse the direction of flow by either changing the electrodes of this circuit or by providing a source of energy greater than that generated in the earth and in opposition thereto which would cause a flow of current in the direction reverse to that just described.

In the casing circuit which includes the external and the internal circuits it is preferable to make the ground or electrode 20 from a metal which as electro-positive with respect to the iron casing 14 and metals, such, as example, as zinc may be used. A further reason for making the ground 20 electro-positive is that the ground 26 is electro-negative with the result that there is a potential difference between the ground 20 and the ground 26 which produces an additional flow of current which has been found to be of value in obtaining readings from the recording device 21 which are very distinct in character and which very clearly show up the different formations in the well. The flow of current in the casing circuit, both external and internal, is as follows. The electricity flows from the electrode 20 through the earth to the casing 14 and from the upper end of the casing through the conductor 18 to the ground 20. There is also a flow of current from the ground 20 to the ground 26 and through the conductor 27 in the same direction as the flow of current previously described with respect to the well circuit. As is true in connection with the well circuit, it is possible in the casing circuit to make the electrode 20 electro-negative with respect to the casing 14 and to produce a flow of current in the opposite direction.

The results of my invention are obtained by reason of the influence of one flow of current on the other flow of current, and although better results are obtained when the flows of current are in the direction indicated in Fig. 1, satisfactory readings may be obtained by reversing either or both of the current flows.

It is possible in my invention to place the recording device 21 in the well circuit and to obtain a record which will indicate the location of the sands and shale. However, it is found that the earth currents for some reason give a little more interference to the currents flowing through the well circuit, and therefore I prefer to place the recording device 21 in the casing circuit because the record which is produced is a little more distinct in its indications.

I will now refer to Fig. 1 and describe the method followed in installing the apparatus of my invention and the method in which the record, as illustrated in Fig. 7, is obtained.

When it is desired to make a test and determination of the sands and shales in a well, I first install the grounds 20 and 26 preferably in the locations shown in Fig. 1, the ground 26 being 125 feet, more or less, from the well, and the ground 20 being 250 feet, more or less, from the well. The two circuits are then connected to the grounds and casings and the electrode 30 is lowered into the well to a point opposite a particular shale or other known formation in the well. In the particular well illustrated the shale 16 is the one in which the shoe has been installed and is one which is known in the fields as being a particular body of shale.

The meter 34 is then observed and if the current flow is not 860 millivolts plus or minus 150 millivolts, the resistance 33 is operated either to increase or decrease the resistance in order to bring the reading to approximately 860 millivolts. The flow of current from the ground 20 to the casing 19 is then observed, this being done by disconnecting the shunt circuit 22. This voltage should be approximately 380 millivolts but may vary plus or minus 100 millivolts. If the millivolt of this circuit is not within the range, it may be desirable to insert an artificial source of energy in the conductor 18, such as a battery, in order to increase this voltage. However, it is found that ordinarily this flow of current will be adequate without any batteries inserted in the conductor 18. It is only where the casing 14 is so old and corroded that there is very little chemical action that it is necessary to use a battery in the casing circuit. If the voltage is too high, resistance may be inserted to decrease it. The next determination which is made is the potential difference between the grounds 20 and 26. This should be approximately 970 millivolts with the ground 26 positive in the external circuit. If this voltage is not within 150 millivolts of this figure, the distance between the grounds 20 and 26 is then changed until the desired voltage between these two grounds is obtained.

The potential differences which have been pointed out have been determined through considerable experimentation as being productive of the best results. It should be strictly understood that the invention is not to be limited to these potential differences or corresponding current flows in various circuits, since records can be obtained using other voltages, currents, and other relationships between the various circuits. However, conditions may exist in which it would be desirable to use other potentials, currents, and other relationships of the parts.

I have given the voltages, spacing of the parts, and relationship of the parts which I have found to be the most efficient in actual practice not to place limitations on the invention but solely in order that this specification may teach those skilled in the art of the manner in which I believe to be the best mode of practicing my present invention.

After the parts have been so positioned and the voltages adjusted as pointed out heretofore, the next step is to balance or adjust the voltage in the external casing circuit in order that the chart produced on the graph paper will be in a centralized position. The shunt circuit 22 is therefore connected and the resistance 24 is adjusted so that the stylus 44 is set in a desired position on the graph paper 48. The apparatus is now ready for making the record which is done by winding up the drum 28 very slowly and raising the electrode 30. As the drum 28 is wound up the small drum 47 carrying the graph paper is rotated in accordance therewith. Furthermore, as the electrode 30 is raised there will be a fluctuation in the flow of current through the casing circuit and through the conductor 18 with the result that the meter 40 will be operated in accordance therewith which will move the pointer 42 and arm 43 and will cause the stylus to move to the right or left relative to the graph paper 48 as shown in Fig. 2. When the top of the well is reached the graph paper may be removed from the drum 47 and it will be found that a line has been placed thereon as shown in Fig. 7, and from this chart it is possible to locate shale and sand formations, as will be pointed out shortly.

When the apparatus is set up and in operation, as previously described, there is a flow of current through the conductor 27 from the ground 26 to the electrode 30, and through the earth from the electrode 30 to the ground 26. There is also a flow of current through the conductor 18 from the top of the casing 14 to the ground 20. This flow is completed by a flow of current from the ground 20 through the earth to the casing 14. I have furthermore determined that there is a flow of current through the earth from the ground 20 to the ground 26, this being determined by making a test in the external circuit. I therefore believe that in the performance of my invention there are at least three flows of currents in the ground. There appears to be one flow of current from the electrode 30 to the casing 14 and to the ground 26; another flow of current from the ground 20 to the casing 14; and a third flow of current from the ground 20 to the ground 26.

When the electrode 30 is in different positions in the well the electrical characteristics (which term I use to broadly identify either a change in voltage, amperes, or both) in both of the conductors 18 and 27 change, and there is a definite cause and effect relationship between the current flows or voltages of the two conductors. It appears that whenever the electrode 30 is opposite a shale there are certain electrical characteristics in the conductors 18 and 27, and that when the electrode 30 is opposite a sand there are certain other electrical characteristics in the conductors 18 and 27. Experience has indicated that these different electrical characteristics accurately indicate the type of formation which is directly adjacent the electrode 30 and this holds true with such accuracy that I am able to obtain a record, as shown in Fig. 7, which can be used by geologists to locate oil bearing sands and to therefore find the level at which the casing 14 should be perforated in order to obtain oil.

The point at which the electrical flow or voltage passes through the wall of the well and through the adjacent formations is determined by the position of the electrode 30. Since the electrical flow diverges and spreads quite rapidly after it enters the earth, the electrical resistance and characteristics of the material located immediately adjacent the portion of the well where the electrode is positioned will effect the current flow or voltages in the conductors 18 and 27. It is important in the method of my invention that the only variable be that produced by the stratum which is located directly opposite the electrode 30. All other values must remain fixed, since it is the purpose of the method to locate the depth at which the various strata occur in the well.

In the practice of my invention I maintain the values of the voltaic cell substantially uniform by maintaining the electrode 30 in a uniform position relative to the wall of the well through which the test is made. As illustrated in Fig. 6, the distance A is always maintained constant in order that the values of the voltaic cell or the values in the relationship between the electrode 30 and the wall of the well may be maintained constant. This is highly desirable, for example, from the standpoint of resistance. If this distance were to vary, the resistance in the well circuit would change, which obviously would cause a fluctuation of the recording means which would not be caused by the adjacent formation. The changes in resistance due to a change in the distance A are quite substantial when it is remembered that the current flows or voltages which are measured may be quite small.

Referring to Fig. 7 which illustrates a graph produced by the recording device 21, the curve or line drawn by the stylus not only indiciates the location of shales and sands but also the depth, since the drum 47 was rotated so that it occupied a position correlated with the position of the electrode 30. It has been found from experience that all of the peaks extending to the left indicate shale formations and all of the peaks which point to the right indicate sand formations. The extent and size of the peaks in turn indicate the extent and size of the shale and sand formations. The graph produced by my invention is a complete and final record which may be used for determining the location of various formations and the point at which oil may be found. It is unnecessary to make any mathematical computations or calculations, since all that it is necessary to do is to examine the curve which of itself indicates the types of formations and their location.

In Fig. 1 I have illustrated apparatus designed for use in cased holes and have illustrated a plurality of electrical circuits. My invention may be used in uncased holes, as pointed out heretofore, and when so used it is unnecessary to provide the casing circuit 18. Where there is no casing, or where tests are being made below the casing, the meter 34 is used to measure the different values and in that event the meter 34, if desired, may be a recording type of meter, such as the meter 21. When so using the method and apparatus of my invention fluctuations occurring in the well circuit occur in accordance with the character of the strata opposite the electrode 30, and by maintaining all values in the method constant, except changes produced by the stratum adjacent the electrode 30, the various shales and sands may be located.

When it is desired to locate the electrode 30 relatively close to one side or wall of the well, apparatus, such as shown in Figs. 8 and 9, may be employed. As shown in these two figures, the supporting bars 57 support a gyroscope 80 having a depending shaft 81 to which a support plate 82 is adjustably secured. The support plate 82 carries the electrode 30 and also a counterbalance 83. The gyroscope 80 is energized by a battery 84 preferably carried in a depending tubular housing 85, one lead 86 of the battery being connected to the gyroscope, and the other lead 87 thereof being grounded. The shaft 81 is at all times oriented, and by adjusting the support plate 82 to a desired position the gyroscope will maintain the electrode 30 in a predetermined oriented position in the well at all times. The shaft 81 of the gyroscope is suitably insulated from the apparatus and the conductor 27 which extends through the cable 52 is connected to a contact 89 of a suitable switch, such as a mercury switch 90. This contact 89 extends into a container 91 which contains a body of mercury 92. Also extending through the body of mercury 92 is a contact 93 which is connected to the upper end of the shaft 81, and in this manner the electrode 30 is connected to the conductor 27 and to the external well circuit. The other parts of the electrode apparatus may be of the same construction as that shown in Figs. 2 to 4 inclusive, and for similar parts the same numerals are used in Figs. 8 and 9 which are used in Figs. 2 to 4 inclusive.

As pointed out heretofore, this electrode apparatus may be employed whenever it is desired to situate the electrode 30 relatively close to one side of the well during the making of a test. The gyroscope maintains the electrode in an oriented position and the guide arms 63 maintain the apparatus so that the electrode 30 occupies a predetermined axial position in the well.

In Figs. 10 and 11 I have illustrated the manner in which this form of electrode apparatus is employed where there is an interfering object adjacent the well. As shown in Fig. 10, there is embedded in the strata surrounding the well an interfering object in the form of a bit or piece of drill pipe 100 which has been left in the well during the drilling thereof. In order to avoid interference which may be caused by this object, the electrode apparatus shown in Fig. 8 is used. The plate 82 is adjusted so that the electrode 30 will be maintained at the side of the well 11 opposite from the object 100, and at the same time the circuits are connected at the surface of the ground on the side of the well to which the electrode 30 is positioned and remote from the object 100. The performance of the test may be the same as described in connection with Fig. 1 both with respect to testing in cased or uncased holes.

In Fig. 12 I have illustrated the manner in which my invention may be utilized in locating the inclination of a stratum. The apparatus shown in Figs. 8 and 9 is employed in the test and the plate 82 is first adjusted so that the electrode 30 will be located near one side of the well and be moved along the well along a center line 105. In this figure the numeral 106 represents a stratum having considerable inclination. At the left side of the well the stratum meets the well at a plane 107, and at the right side of the well the stratum meets the well at a plane 108. It will be noted that the plane 107 is substantially lower than the plane 108. When the test is made with the electrode moving along the plane or center line 105, the circuits are connected to the surface of the ground at the left of the well so that the test is made outwardly to the left. When the electrode reaches a position as indicated at 110, there will be a fluctuation in values recorded by the recording means which will indicate the plane 107, and when the electrode reaches a position as indicated at 111, at the bottom of the stratum 106 there will be a further fluctuation. This will indicate the upper and lower limits of the stratum on the left side of the well. The plate 82 is then adjusted by rotating it 180 degrees which moves the electrode 30 to an extreme rightward position so that it will move along a center line 112. Also the connections for the circuit or circuits with the earth are moved to the right side of the well so that the tests will now be made through the right wall of the well. When the electrode reaches the position as shown at 114, there will be a fluctuation in the values recorded, and when the electrode reaches the position 115 there will also be a fluctuation. This determines the limits of the stratum 106 on the right side of the well. By comparing the points at which the fluctuations occur, it will be seen that the fluctuations on the left side of the well are somewhat lower than the fluctuations on the right side of the well. By laying out this portion of the well accurately as to its diameter and inclination and by then locating the points at which the fluctuations occur on the opposite sides of the well, a line, such as 116, and another line, such as 118, may be drawn which indicate the thickness of the stratum, its depth in the well, and also its inclination.

The electrode apparatus illustrated in Figs. 13 and 14 employs two electrodes which may be used in the testing of water leakages into the well. A cable 125 is secured by a connection 126 to the electrode apparatus which supports the electrodes 127 and 128, which are connected to conductors 129 and 129a which extend through the cable 125 to the surface of the ground. This apparatus includes an upper shaft 130 and a lower shaft 131, the upper shaft having supporting arms 132, and the lower shaft having supporting arms 133 which extend toward each other and respectively support plates 134 and 135 to which the electrodes 127 and 128 are secured. Mounted on the shafts 130 and 131 are hubs 138 and 139 which are forced toward each other by a spring 140 compressed between the connection 126 and the hub 138 and a spring 141 compressed between a nut 142 mounted on the end of the shaft 136 and the hub 139. Connected to the hubs 138 and 139 are centralizing bars 143 which bow outwardly at their central portions, as shown in Fig. 13, for engagement with the wall of the well or the casing which may be installed in the well. These centralizing arms 143 are resilient so that they may accommodate themselves to different diameters of wells. The springs 140 and 141 always hold the central portions of the centralizing arms 143 outwardly so that the wall of the well will be engaged.

As is illustrated best in Fig. 14 the axis of the well is indicated by the point 144. The centralizing arms 143, being caused to engage the wall of the well, always maintain the electrodes 127 and 128 in a predetermined position with respect to the axis of the well. The distance A and the distance B which represent the distances between the electrode 127 and the wall of the well and the electrode 128 and the wall of the well are always maintained uniform and of the same length. Where the diameter of the well is smaller the distances A and B will, of course, be smaller, and where the diameter of the well is larger the distances A and B will, of course, be larger. However, in a well of a given size these distances A and B are maintained substantially uniform, with the result that the electrical or electro-chemical relationship between these electrodes and the wall of the well will be maintained constant or uniform, and there will be no deviating or changing influence on the recordings obtained at the surface of the ground due to mis-alignment or swinging movement of the electrodes 127 and 128. The electrode apparatus is so designed that the electrodes 127 and 128 are accurately guided along the axis of the well as the apparatus is moved either upward or downward in the well, and therefore the electrodes are caused to follow the contour of the well even though it deviates considerably from vertical, and in this way the relationship between the electrodes in the well is maintained so that there will be no fluctuations which would cause false indications of the recording apparatus.

In Figs. 15 and 16 I show an apparatus in which electrodes 150 and 151 are both positioned concentric to the well at different elevations. This form of my invention has a separate centralizing means as follows. Mounted on a cable 152 are upper and lower sleeves 153 and 154 having end shoulders 155 and 156. Slidably mounted on each sleeve 153 and 154 are hubs 157 to which are connected centralizing arms 158 which are caused to engage the wall of the well by compression springs 159 mounted on the sleeves 153 and 154 and compressed between the hubs 157 and shoulders 155. The electrodes 150 and 151 are in the form of sleeves which are mounted on the cable 152 and may be connected respectively to conductors 161 and 162 contained within the cable 152. A weight 163 may be secured to the lowermost sleeve 154 if desired to hold the cable taut.

The centralizing arms 158 support each of the electrodes 150 and 151 in a concentric position. The cable 152 forms a flexible joint or universal joint at a position 164 between the upper and lower sections of the electrode construction, and one section does not interfere with the operation of the other.

It will be obvious that any number of sections with as many electrodes may be readily applied to the cable.

It is believed that the foregoing detailed description is sufficient to instruct those skilled in the art as to how my invention may be practiced. It should be understood, however, that I do not wish to be limited to the details described, but wish my invention to be broadly construed in accordance with the principle and operation thereof and in accordance with the scope of the appended claims.

I claim as my invention:

1. A method of determining the location of strata in a well, which method includes the steps of: forming an electric circuit including an electrode movable in said well; moving said electrode in said well; maintaining said electrode in definite oriented position in said well; and measuring changes in electrical values which occur when said electrode is moved into various positions in said well.

2. A method of determining the location of strata in a well, which method includes the steps of: forming an electric circuit including an electrode movable in said well; moving said electrode in said well; maintaining a constant relationship between said electrode and the wall of said well; and in positions relatively close to one side of said well; and measuring changes in electrical values which occur when said electrode is moved into various positions in said well.

3. In combination in well testing apparatus for determining the location of strata in a well: an electrode; means for moving said electrode along said well; an electrical conductor connected to said electrode and extending to the surface of the ground; and orienting means for causing said electrode to occupy a uniform oriented position relative to the axis of said well in its different positions along said well.

4. In combination in well testing apparatus for determining the location of strata in a well: an electrode; means for moving said electrode along said well; an electrical conductor connected to said electrode and extending to the surface of the ground; wall engaging means; and orienting means supported by said wall engaging means and operatively connected to said electrode for causing said electrode to occupy a uniform position relative to the axis of said well in its different positions along said well.

5. In testing apparatus for use in making tests in wells, an electrode apparatus, the combination of: a supporting structure; a plurality of electrodes mounted on said supporting structure in the same transverse plane; means connected to said supporting structure whereby said plurality of electrodes may be moved into various elevational positions in the well; and centralizing means supported by said supporting structure and engageable with the wall of the well for supporting said plurality of electrodes in uniform positions relative to the wall of the well when said plurality of electrodes is in different elevational positions.

6. In testing apparatus for use in making tests in wells, an electrode construction, the combination of: a supporting structure; a plurality of electrodes mounted on said supporting structure in different transverse planes; means connected to said supporting structure whereby said plurality of electrodes may be moved into various elevational positions in the well; and centralizing means supported by said supporting structure and engageable with the wall of the well for supporting said plurality of electrodes in uniform positions relative to the wall of the well when said plurality of electrodes is in different elevational positions.

7. In testing apparatus for use in making tests in wells, an electrode construction, the combination of: a pair of electrode apparatus, one positioned above the other, each including electrode means, and centralizing means for maintaining said electrode means in uniform positions relative to the wall of the well; flexible connecting means connecting said electrode apparatus together; and means for moving said apparatus into different elevational positions in said well.

8. In combination in well testing apparatus for determining the location of strata in a well: a plurality of electrodes positioned one above the other; electrical conductor means connected to said electrodes and extending to the surface of the ground; means whereby said electrodes may be moved along said well; and means for causing said electrodes to occupy a position concentric to the axis of said well at any position along said well.

9. In combination in well testing apparatus for determining the location of strata in a well: a plurality of electrodes; electrical conductor means connected to said electrodes and extending to the surface of the ground; means whereby said electrodes may be moved along said well; and means cooperable between the wall of the well and at least one of said electrodes for maintaining at least one of said electrodes concentric to the axis of said well.

10. In a testing apparatus of the character described for use in making tests in wells, the combination of: a supporting structure; means to accomplish movement of said supporting structure to different positions in a well; centralizing means on said supporting structure to yieldably engage the wall of the well so as to have movement to compensate for changes in diameter of the well and being so formed as to maintain said supporting structure in a uniform position relative to the axis of the well; an electrode carried by said supporting structure in a position offset from the axis of said well; and circuit forming means connected to said electrode and having therewith electro-responsive indicating means.

11. In testing apparatus of the character described for use in making tests in wells, the combination of: a supporting structure; a plurality of electrodes mounted on said supporting structure; means to accomplish movement of said supporting structure to different positions in a well; circuit forming means connected to said electrodes, said circuit forming means including indicating means connected therewith; and centralizing means on said supporting structure to yieldably engage the wall of the well so as to have movement to compensate for changes in diameter of the well, said centralizing means being so formed as to maintain said electrodes in uniform position relative to the axis of the well.

12. In testing apparatus of the character described for use in making tests in wells, the combination of: a supporting structure; a plurality of electrodes mounted on said supporting structure; means to accomplish movement of said supporting structure to different positions in a well; circuit forming means connected to said electrodes, said circuit forming means including indicating means connected therewith; and centralizing means on said supporting structure to yieldably engage the wall of the well so as to have movement to compensate for changes in diameter of the well, said centralizing means being so formed as to maintain said supporting structure in uniform position relative to the axis of the well.

13. In testing apparatus of the character described for use in making tests in wells, the combination of: a supporting structure; a plurality of electrodes mounted on said supporting structure so as to lie in the same transverse plane; means to accomplish movement of said supporting structure to different positions in a well; circuit forming means connected to said electrodes, said circuit forming means including indicating means connected therewith; and centralizing means on said supporting structure to yieldably engage the wall of the well so as to have movement to compensate for changes in diameter of the well, said centralizing means being so formed as to maintain said supporting structure in uniform position relative to the axis of the well.

14. In electrode apparatus for longitudinal movement in a well bore, the combination of: a supporting structure adapted to be lowered into the well; a rotatable part carried by said supporting structure; electrode means eccentrically mounted on said rotatable part; a gyroscope operative to orient said rotatable part; means for driving said gyroscope; and means forming a circuit connected to said electrode.

15. In electrode apparatus for longitudinal movement in a well bore, the combination of: a supporting structure adapted to be lowered into the well; a rotatable part carried by said supporting structure; electrode means eccentrically mounted on said rotatable part; a gyroscope operative to orient said rotatable part; means for driving said gyroscope; means forming a circuit connected to said electrode; and means carried by said supporting structure to engage the wall of the well so as to guide said supporting structure as it is moved longitudinally of the well.

GEORGE H. ENNIS.